US011984736B2

(12) United States Patent
Muratov (10) Patent No.: US 11,984,736 B2
(45) Date of Patent: May 14, 2024

(54) DETECTING FOREIGN OBJECTS IN WIRELESS POWER TRANSFER SYSTEMS

(71) Applicant: MEDIATEK Singapore Pte. Ltd., Singapore (SG)

(72) Inventor: Vladimir Alexander Muratov, San Jose, CA (US)

(73) Assignee: MEDIATEK Singapore Pte. Ltd., Singapore (SG)

(*) Notice: Subject to any disclaimer, the term of this patent is extended or adjusted under 35 U.S.C. 154(b) by 220 days.

(21) Appl. No.: 17/150,564

(22) Filed: Jan. 15, 2021

(65) Prior Publication Data

US 2021/0135506 A1    May 6, 2021

Related U.S. Application Data

(63) Continuation of application No. PCT/CN2019/096846, filed on Jul. 19, 2019.

(60) Provisional application No. 62/700,369, filed on Jul. 19, 2018.

(51) Int. Cl.
*H02J 50/60* (2016.01)
*H02J 50/12* (2016.01)

(52) U.S. Cl.
CPC ............. *H02J 50/60* (2016.02); *H02J 50/12* (2016.02)

(58) Field of Classification Search
CPC ................................. H02J 50/60; H02J 50/12
See application file for complete search history.

(56) References Cited

U.S. PATENT DOCUMENTS

| | | | |
|---|---|---|---|
| 9,057,753 B2 | 6/2015 | Nakano et al. | |
| 9,178,361 B2 | 11/2015 | Liu et al. | |
| 9,294,153 B2 | 3/2016 | Muratov et al. | |
| 9,360,456 B2 | 6/2016 | Miyamoto | |
| 9,806,769 B2 | 10/2017 | Nakano et al. | |
| 10,199,881 B2 | 2/2019 | Muratov et al. | |
| 10,530,196 B2 | 1/2020 | Oettinger et al. | |
| 10,581,281 B2 | 3/2020 | Muratov | |
| 10,868,446 B2 | 12/2020 | Muratov et al. | |
| 10,916,972 B2 | 2/2021 | Muratov et al. | |
| 10,916,973 B2 | 2/2021 | Park et al. | |

(Continued)

FOREIGN PATENT DOCUMENTS

| | | |
|---|---|---|
| CN | 101981780 A | 2/2011 |
| CN | 103308948 A | 9/2013 |

(Continued)

OTHER PUBLICATIONS

Extended European Search Report for European Application No. EP 19838641.9 dated Feb. 23, 2022.

(Continued)

*Primary Examiner* — Daniel Cavallari
*Assistant Examiner* — Brian K Baxter
(74) *Attorney, Agent, or Firm* — Wolf, Greenfield & Sacks, P.C.

(57) ABSTRACT

Foreign object detection for a wireless power transmitter can be performed using a reference Q-factor and reference frequency for a wireless power receiver. A figure of merit may be calculated using the reference Q-factor and reference frequency. A Q-factor and resonant frequency may be measured, and a measurement figure of merit can be calculated. The figures of merit can be compared to determine where a foreign object is present.

31 Claims, 6 Drawing Sheets

(56) References Cited

U.S. PATENT DOCUMENTS

| | | | |
|---|---|---|---|
| 11,038,382 B2 | 6/2021 | Park et al. | |
| 11,476,721 B2 | 10/2022 | Muratov et al. | |
| 11,496,000 B2 | 11/2022 | Muratov | |
| 11,527,921 B2 | 12/2022 | Muratov et al. | |
| 2008/0025055 A1 | 1/2008 | Miyazaki et al. | |
| 2009/0302800 A1 | 12/2009 | Shiozaki et al. | |
| 2010/0001847 A1 | 1/2010 | Takaishi et al. | |
| 2011/0196544 A1 | 8/2011 | Baarman et al. | |
| 2012/0049861 A1* | 3/2012 | Kim | H02J 50/12 324/633 |
| 2012/0147802 A1 | 6/2012 | Ukita et al. | |
| 2012/0161538 A1 | 6/2012 | Kinoshita et al. | |
| 2012/0326660 A1 | 12/2012 | Lu et al. | |
| 2013/0027078 A1* | 1/2013 | Nakano | H04B 5/0037 324/633 |
| 2013/0113296 A1* | 5/2013 | Ryu | B60L 53/12 307/104 |
| 2013/0162054 A1 | 6/2013 | Komiyama | |
| 2013/0241302 A1 | 9/2013 | Miyamoto et al. | |
| 2013/0264997 A1* | 10/2013 | Lee | H02J 50/80 320/106 |
| 2014/0077617 A1 | 3/2014 | Nakano et al. | |
| 2014/0084857 A1 | 3/2014 | Liu et al. | |
| 2014/0084946 A1* | 3/2014 | Clark | H02J 50/80 324/654 |
| 2014/0111019 A1 | 4/2014 | Roy et al. | |
| 2014/0125287 A1* | 5/2014 | Nakano | H02J 50/80 307/104 |
| 2014/0191715 A1 | 7/2014 | Wechlin et al. | |
| 2014/0327393 A1 | 11/2014 | Lee et al. | |
| 2015/0028875 A1 | 1/2015 | Irie et al. | |
| 2015/0073768 A1 | 3/2015 | Kurs et al. | |
| 2015/0155095 A1 | 6/2015 | Wu et al. | |
| 2015/0285926 A1 | 10/2015 | Oettinger | |
| 2015/0302985 A1* | 10/2015 | Kurs | H01F 3/10 336/119 |
| 2015/0309126 A1 | 10/2015 | Jung et al. | |
| 2015/0323694 A1 | 11/2015 | Roy et al. | |
| 2015/0331135 A1 | 11/2015 | Widmer | |
| 2015/0372503 A1* | 12/2015 | Toncich | H02J 50/12 307/31 |
| 2016/0020630 A1* | 1/2016 | Tseng | H02J 50/80 320/108 |
| 2016/0065269 A1 | 3/2016 | Yazaki | |
| 2016/0087471 A1 | 3/2016 | Wilson | |
| 2016/0091544 A1* | 3/2016 | Daneshmand | G01N 22/00 324/633 |
| 2016/0141889 A1 | 5/2016 | Choudhary et al. | |
| 2016/0181874 A1* | 6/2016 | Raveh | H02J 50/70 307/104 |
| 2017/0047777 A1 | 2/2017 | Nakano et al. | |
| 2017/0117755 A1 | 4/2017 | Muratov et al. | |
| 2017/0117756 A1* | 4/2017 | Muratov | H02J 50/60 |
| 2017/0149287 A1 | 5/2017 | Nakano et al. | |
| 2017/0163101 A1 | 6/2017 | Muratov | |
| 2017/0187238 A1 | 6/2017 | Chong et al. | |
| 2017/0229926 A1 | 8/2017 | Oettinger et al. | |
| 2017/0310166 A1 | 10/2017 | Huang et al. | |
| 2017/0366048 A1* | 12/2017 | Watanabe | H02J 50/60 |
| 2018/0090968 A1* | 3/2018 | Pais | H04B 5/0081 |
| 2018/0115197 A1* | 4/2018 | Li | H02J 50/60 |
| 2018/0183277 A1 | 6/2018 | Ikefuji et al. | |
| 2018/0241257 A1* | 8/2018 | Muratov | H02J 50/10 |
| 2018/0342898 A1 | 11/2018 | Ikefuji | |
| 2019/0131826 A1 | 5/2019 | Park et al. | |
| 2019/0148810 A1* | 5/2019 | Xiang | H01P 7/06 333/222 |
| 2019/0190320 A1* | 6/2019 | Park | H02J 50/12 |
| 2019/0199142 A1 | 6/2019 | Muratov et al. | |
| 2019/0326782 A1* | 10/2019 | Graham | H02J 50/90 |
| 2020/0091776 A1* | 3/2020 | Kondo | G01V 3/10 |
| 2020/0259373 A1 | 8/2020 | Park et al. | |
| 2020/0328625 A1* | 10/2020 | Mills | H04B 5/0037 |
| 2020/0350788 A1* | 11/2020 | Park | H02J 50/20 |
| 2021/0057939 A1 | 2/2021 | Muratov et al. | |
| 2021/0184510 A1 | 6/2021 | Park | |
| 2021/0194294 A1* | 6/2021 | Sieber | G01V 3/101 |
| 2021/0210990 A1 | 7/2021 | Muratov | |
| 2021/0242724 A1 | 8/2021 | Muratov et al. | |
| 2021/0296938 A1 | 9/2021 | Kwon et al. | |

FOREIGN PATENT DOCUMENTS

| | | |
|---|---|---|
| CN | 104160287 A | 11/2014 |
| CN | 105474511 A | 4/2016 |
| CN | 106371143 A | 2/2017 |
| CN | 106463973 A | 2/2017 |
| CN | 106464027 A | 2/2017 |
| CN | 107947395 A | 4/2018 |
| CN | 207200393 U | 4/2018 |
| CN | 109804530 A | 5/2019 |
| EP | 3093955 A1 | 11/2016 |
| EP | 3107188 A1 | 12/2016 |
| EP | 3 123 587 B1 | 2/2017 |
| EP | 3160008 A1 | 4/2017 |
| KR | 10-2011-0051727 A | 5/2011 |
| KR | 101 683 651 B1 | 12/2016 |
| KR | 10-2017-0118571 A | 10/2017 |
| KR | 20170140685 A | 12/2017 |
| KR | 2018-0022513 A | 3/2018 |
| KR | 2018-0065693 A | 6/2018 |
| TW | 2010-01866 A | 1/2010 |
| TW | I506916 B | 11/2015 |
| WO | WO 2005/109598 A1 | 11/2005 |
| WO | WO 2009/081115 A1 | 7/2009 |
| WO | WO 2013/164831 A1 | 11/2013 |
| WO | WO 2013/190809 A1 | 12/2013 |
| WO | WO 2015/029370 A1 | 3/2015 |
| WO | WO 2016/006441 A1 | 1/2016 |
| WO | WO 2016/208392 A1 | 12/2016 |
| WO | WO 2017/064955 A1 | 4/2017 |
| WO | WO 2017/070227 A1 | 4/2017 |
| WO | WO 2017/194338 A1 | 11/2017 |
| WO | WO 2018/004120 A1 | 1/2018 |
| WO | WO 2018/020876 A1 | 2/2018 |
| WO | WO 2018/038531 A1 | 3/2018 |

OTHER PUBLICATIONS

Extended European Search Report for European Application No. EP 19838135.2 dated Feb. 23, 2022.
*U.S. Appl. No. 17/150,639, filed Jan. 15, 2021, Muratov.
PCT/CN2019/096863, Oct. 17, 2019, International Search Report and Written Opinion.
*U.S. Appl. No. 15/244,107, filed Aug. 23, 2016, Muratov et al.
*U.S. Appl. No. 16/228,556, filed Dec. 20, 2018, Muratov et al.
*U.S. Appl. No. 15/957,704, filed Apr. 19, 2018, Muratov et al.
*U.S. Appl. No. 15/297,226, filed Oct. 19, 2016, Muratov.
*U.S. Appl. No. 17/093,272, filed Nov. 9, 2020, Muratov et al.
*U.S. Appl. No. 17/142,953, filed Jan. 6, 2021, Muratov et al.
EP 161948765, Mar. 24, 2017, Extended European Search Report.
EP 18168832.6, Jun. 18, 2018, Extended European Search Report.
EP 19204947.6, Apr. 24, 2020, Partial European Search Report.
EP 19204947.6, Jun. 12, 2020, Extended European Search Report.
International Search Report and Written Opinion for International Application No. PCT/CN2019/096863 dated Oct. 17, 2019.
International Search Report and Written Opinion for International Application No. PCT/CN2019/096846 dated Sep. 26, 2019.
Extended European Search Report for European Application No. EP 16194876.5 dated Mar. 24, 2017.
Extended European Search Report for European Application No. EP 18168832.6 dated Jun. 18, 2018.
Partial European Search Report for European Application No. EP 19204947.6 dated Apr. 24, 2020.
Extended European Search Report for European Application No. EP 19204947.6 dated Jun. 12, 2020.

(56) References Cited

OTHER PUBLICATIONS

Extended European Search Report for European Application No. EP 22167918.6 dated Jul. 27, 2022.

* cited by examiner

DETECTING FOREIGN OBJECTS IN WIRELESS POWER TRANSFER SYSTEMS

CROSS-REFERENCE TO RELATED APPLICATIONS

This Application is a Continuation of International Patent Application Serial No. PCT/CN2019/096846, filed Jul. 19, 2019, entitled "DETECTING FOREIGN OBJECTS IN WIRELESS POWER TRANSFER SYSTEMS", which claims priority to U.S. Provisional Application Ser. No. 62/700,369, filed Jul. 19, 2018, entitled "METHODS FOR FOREIGN OBJECT DETECTION IN INDUCTIVE WIRELESS POWER TRANSFER". The entire contents of these applications are incorporated herein by reference in their entirety.

BACKGROUND

1. Technical Field

The techniques described herein relate generally to wireless power delivery, and particularly to detection of foreign objects in the field produced by a wireless power transmitter.

2. Discussion of the Related Art

Wireless Power Transfer Systems (WPTS) are gaining increasing popularity as convenient way to deliver power without wires or connectors. WPTS currently under development in the industry can be separated in two major classes: magnetic induction (MI) systems and magnetic resonance (MR) systems. Both types of systems include a wireless power transmitter and a wireless power receiver. Such systems can be used to power or charge mobile devices such as smartphones or tablet computers, among other applications. Such a mobile device includes a wireless power receiver that can have power transferred thereto wirelessly by a wireless power transmitter. A wireless power transmitter may be within a pad or stand on which the mobile device can be placed, for example, during wireless charging.

Inductive WPTS typically operate in an allocated frequency range of several hundred kilohertz using frequency variation as a power flow control mechanism.

MR WPTS typically operate on a single resonant frequency using input voltage regulation to regulate output power. In typical applications, MR WPTS operate at a frequency of 6.78 MHz.

Several industry committees have been working on developing international standards for consumer products based on wireless power transfer.

SUMMARY

Some embodiments relate to a method of performing foreign object detection for wireless power transfer between a wireless power transmitter and a wireless power receiver, the method comprising, by the wireless power transmitter: measuring a first parameter corresponding to Q-factor and a second parameter corresponding to resonant frequency of a system including the wireless power transmitter and the wireless power receiver to produce a first measurement corresponding to a Q-factor measurement and a second measurement corresponding to a resonant frequency measurement; receiving one or more third parameters corresponding to a reference Q-factor of the wireless power receiver and a reference frequency of the wireless power receiver; and determining whether a foreign object is present based on the first, second and one or more third parameters.

The method may further comprise calculating a measured figure of merit (FOM) based on the first and second parameters.

The method may further comprise calculating a reference figure of merit (FOM) based on the one or more third parameters.

The method may further comprise comparing the reference FOM and the measured FOM to produce a comparison.

The determining of whether a foreign object is present may be based on the comparison.

The determining may be performed by evaluating whether the reference FOM and the measured FOM differ by more than a threshold amount, or whether a ratio between the reference FOM and the measured FOM differ by more than a threshold amount.

The reference FOM, the measured FOM, or both, may be calculated based on a ratio of a parameter corresponding Q-factor and a parameter corresponding to frequency.

The reference FOM, the measured FOM, or both, may be calculated based on dividing a first function of a parameter corresponding to Q-factor and a second function of a parameter corresponding to frequency.

The first function may comprise a square root function.

The second function may comprise a square function.

The reference FOM, the measured FOM, or both, may be calculated by determining an equivalent series resistance for the foreign object.

The reference FOM, the measured FOM, or both, may be calculated based on an equivalent series resistance of a conductor acceptable to be present in a field produced by a wireless power transmitter during wireless power transmission.

The method may further comprise allowing or disallowing wireless power transfer or adjusting transferred power level, based on whether a foreign object is determined to be present.

The method may further comprise, prior to the determining, evaluating the first parameter, the second parameter or both, to determine whether the wireless power receiver or a foreign object is present.

The method may further comprise, when the wireless power receiver is determined to be present, increasing a strength of a field produced by the wireless power transmitter prior to receiving the one or more third parameters from the wireless power receiver.

Some embodiments relate to a controller for a wireless power transmitter, comprising: circuitry configured to: measure a first parameter corresponding to Q-factor and a second parameter corresponding to resonant frequency of a system including a wireless power transmitter and a wireless power receiver to produce a first measurement corresponding to a Q-factor measurement and a second measurement corresponding to a resonant frequency measurement; receive one or more third parameters corresponding to a reference Q-factor of the wireless power receiver and a reference frequency of the wireless power receiver; and determine whether a foreign object is present based on the first, second and one or more third parameters.

The controller may be configured to calculate a measured figure of merit (FOM) based on the first and second parameters.

The controller may be configured to calculate a reference figure of merit (FOM) based on the one or more third parameters.

The controller may be configured to compare the reference FOM and the measured FOM to produce a comparison.

The controller may be configured to determine whether a foreign object is present is based on the comparison.

The determination may be made by evaluating whether the reference FOM and the measured FOM differ by more than a threshold amount, or whether a ratio between the reference FOM and the measured FOM differ by more than a threshold amount.

The controller may be configured to calculate the reference FOM, the measured FOM, or both, based on a ratio of a parameter corresponding Q-factor and a parameter corresponding to frequency.

The controller may be configured to calculate the reference FOM, the measured FOM, or both, based on dividing a first function of a parameter corresponding to Q-factor and a second function of a parameter corresponding to frequency.

The first function may comprise a square root function.

The second function may comprise a square function.

The controller may be configured to calculate the reference FOM, the measured FOM, or both, by determining an equivalent series resistance for the foreign object.

The controller may be configured to calculate the reference FOM, the measured FOM, or both, based on an equivalent series resistance of a conductor acceptable to be present in a field produced by a wireless power transmitter during wireless power transmission.

The controller may be configured to allow or disallow wireless power transfer or adjusting transferred power level, based on whether a foreign object is determined to be present.

The controller may be configured to, prior to the determining of whether a foreign object is present, evaluate the first parameter, the second parameter or both, to determine whether the wireless power receiver or a foreign object is present.

The controller may be configured to, when the wireless power receiver is determined to be present, increase a strength of a field produced by the wireless power transmitter prior to receiving the one or more third parameters from the wireless power receiver.

Some embodiments relate to a wireless power transmitter, comprising: a controller configured to: measure a first parameter corresponding to Q-factor and a second parameter corresponding to resonant frequency of a system including the wireless power transmitter and a wireless power receiver to produce a Q-factor measurement and a resonant frequency measurement; receive one or more third parameters corresponding to a reference Q-factor of the wireless power receiver and a reference frequency of the wireless power receiver; and determine whether a foreign object is present based on the first, second and one or more third parameters.

Some embodiments relate to a method for use in performing foreign object detection for wireless power transfer between a wireless power transmitter and a wireless power receiver, the method comprising, by the wireless power receiver: sending one or more parameters to the wireless power transmitter corresponding to a reference Q-factor of the wireless power receiver and a reference frequency of the wireless power receiver.

The method may further comprise the wireless power receiver calculating a reference figure of merit based on a parameter corresponding to the reference Q-factor of the wireless power receiver and a parameter corresponding to the reference frequency of the wireless power receiver, and the sending comprises sending at least the reference figure of merit to the wireless power transmitter.

Some embodiments relate to a controller for a wireless power receiver, comprising: circuitry configured to: control the wireless power receiver to send one or more parameters to a wireless power transmitter corresponding to a reference Q-factor of the wireless power receiver and a reference frequency of the wireless power receiver.

The controller may be further configured to calculate a reference figure of merit based on a parameter corresponding to the reference Q-factor of the wireless power receiver and a parameter corresponding to the reference frequency of the wireless power receiver, and the circuitry may be configured to control the wireless power receiver to send at least the reference figure of merit to the wireless power transmitter.

Some embodiments relate to wireless power receiver, comprising: a controller configured to: control the wireless power receiver to send one or more parameters to a wireless power transmitter corresponding to a reference Q-factor of the wireless power receiver and a reference frequency of the wireless power receiver.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

DETAILED DESCRIPTION

Wireless power transfer can be degraded due to the presence of a foreign object in the field produced by the wireless power transmitter. Conductive objects such as metallic objects may absorb power due to the inducement of eddy currents in the conductive object. The presence of such an object can significantly degrade the efficiency of the wireless power transmission. If a metal object is present, efficiency may be reduced substantially (e.g., from 90% to 40%). Further, due to the power absorbed, the temperature of the object may increase significantly, which may be undesirable. Techniques have been developed for sensing the presence of a foreign object by measuring the quality factor (Q-factor). According to such techniques, measuring the Q-factor can be used to determine if a foreign object is present, as the presence of a foreign object reduces the Q-factor of the system. If the Q-factor is outside of an acceptable range, it may be determined that a foreign object is present, and wireless power transmission is disabled. On the other hand, if the Q-factor within an acceptable range, it may be determined that no foreign object is present, and wireless power transmission may be allowed. To determine whether the measured Q-factor is within an acceptable range, one technique is for the wireless power receiver to store a reference Q-factor for the wireless power receiver. The reference Q-factor of the wireless power receiver may have been measured with a reference wireless power transmitter. To perform foreign object detection the wireless power receiver may transmit its reference Q-factor to the wireless power transmitter. The wireless power transmitter may compare the reference Q-factor with a measured Q-factor. If the reference and measured Q-factors are sufficiently close to one another (e.g., within a threshold amount) it may be determined that no foreign object is present. However, if the measured Q-factors are not sufficiently close to one another, it may be determined that a foreign object is present.

The present inventor has recognized and appreciated that the above-described technique for detecting a foreign object may not accurately detect whether a foreign object is present in some circumstances. For example, if the frequency at which the wireless power transmitter measures the Q-factor is different from the frequency at which the reference Q-factor was determined, the comparison between the reference and measured Q-factors may not be a suitable comparison, as Q-factor may vary with the resonant frequency of the system. One technique involves measuring the reference Q-factor at a frequency of 100 kHz. The inventor has appreciated that in practice, when the wireless power transmitter measures the Q-factor in the presence of the wireless power receiver, the resonant frequency may be in a range of 90-110 kHz, for example, and may vary from the 100 kHz frequency at which the reference Q-factor of the wireless power receiver was measured.

The inventor has appreciated the accuracy of foreign object detection may be increased by considering both Q-factor and resonant frequency. In some embodiments, a wireless power receiver may store both a reference Q-factor and a reference frequency. The reference frequency may be the resonant frequency of the wireless power receiver, which may be measured by a reference wireless power transmitter or measurement circuitry. To perform foreign object detection, the wireless power receiver may send both the reference Q-factor and the reference frequency to the wireless power transmitter. The wireless power receiver may use the reference Q-factor and reference frequency to calculate a figure of merit (FOM) that can be used to determine whether a foreign object is present.

In some embodiments, Q-factor and resonant frequency themselves need not be used. Instead, one or more parameters corresponding to Q-factor or resonant frequency, such as parameters related to, indicative of or derived from Q-factor or resonant frequency may be used in an FOM calculation. For example, voltage or current decay of the transmit coil may correspond to and be related to Q-factor, as they may be used to determine Q-factor. As another example, the period of the resonant frequency is the inverse of the resonant frequency, and therefore corresponds (inversely) to and is related to resonant frequency. The reference in this description to calculations performed based on Q-factor or resonant frequency also extends to one or more parameters corresponding to Q-factor or resonant frequency. Further, it should be appreciated that values of the parameters may be sent or stored in rounded or relative form, and need not be exact indicators of the actual parameters.

Figure 1A:
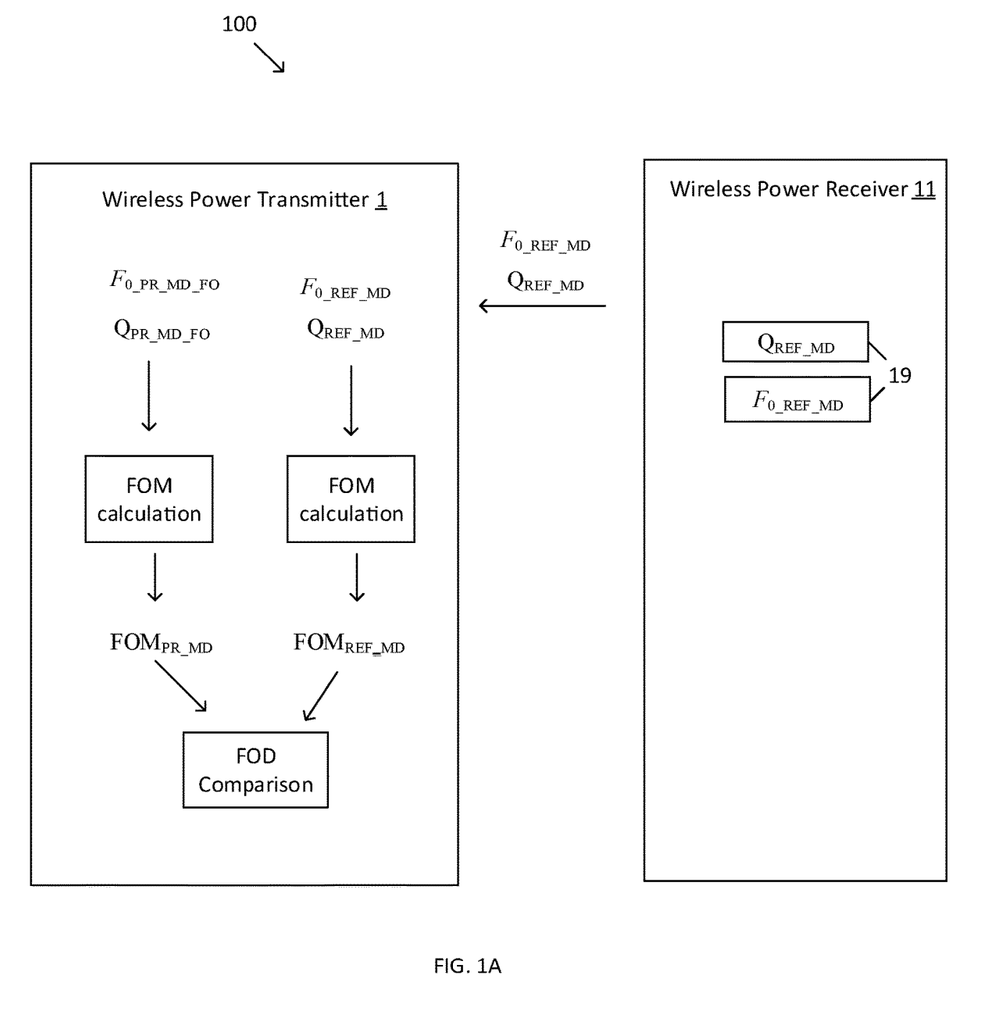
FIG. 1A shows a block diagram of a wireless power system including a wireless power transmitter and a wireless power receiver that provides a reference Q-factor and reference frequency to the wireless power transmitter for foreign object detection (FOD).

FIG. 1A shows a block diagram of a wireless power system 100 including a wireless power transmitter 1 and a wireless power receiver 11. The wireless power transmitter 1 and wireless power receiver 11 may communicate with one another through in-band or out of band communication. The techniques described herein are not limited as to the communication technique used to transfer this information. Prior to the wireless power transmitter 1 initiating wireless power transfer, the wireless power receiver 11 may send reference information to the wireless power transmitter 1. The reference information may include a reference Q-factor ($Q_{REF\_MD}$) and a reference frequency ($F_{0\_REF\_MD}$) which may be a self-resonant frequency of the reference transmitter with the wireless power receiver 11 mounted in the charging position.

In some embodiments, the reference Q-factor and the reference frequency may have been measured during a calibration process and stored in at least one storage device 19 of the wireless power receiver 11, which may be any suitable type of computer-readable storage such as a memory or register, for example. The calibration process may be performed by a reference wireless power transmitter having known parameters or by measurement equipment such as an LCR meter. LCR meters usually perform measurements of Q-factor and coil inductance at the same time at fixed frequency. This frequency may differ from the self-oscillating frequency exhibited by the test transmitters, hence measurements of Q-factor may need be normalized to be compared. However, the techniques described herein are not limited as to techniques for measuring the reference frequency and reference Q-factor of the wireless power receiver.

The wireless power transmitter 1 may use the received reference Q-factor and reference frequency to calculate a FOM for evaluating whether a foreign object is detected. In some embodiments, the FOM is a function of the reference frequency and reference Q-factor, expressed as follows: FOM=f(Q, $F_0$). When a reference FOM ($FOM_{REF\_MD}$) is calculated using the reference Q-factor and reference frequency, the calculation is expressed generally as $FOM_{REF\_MD}=f(Q_{REF\_MD}, F_{0\_REF\_MD})$. The reference FOM may be a basis of comparison for determining whether a foreign object is present. For example, the reference FOM may be compared with a measured FOM to evaluate whether a foreign object is present in practice, such as prior to initiating wireless power transfer between wireless power transmitter 1 and wireless power receiver 11. Alternatively, a no-power transfer time window can be incorporated into the wireless power transmitter operating routine for the purpose of measuring Q-factor, the resonance frequency, and calculation of FOM.

Wireless power transmitter 1 may perform measurements to measure the Q-factor and resonant frequency of the system 100 including the wireless power transmitter 1 and wireless power receiver 11. Any suitable techniques for measuring Q-factor and resonant frequency may be used, a number of which are known in the art and some of which are described herein by way of example. The measured Q-factor is $Q_{PR\_MD\_FO}$. The measured resonant frequency is $F_{0\_PR\_MD\_FO}$. The same FOM calculation is performed using the measured Q-factor and resonant frequency. When a measured FOM ($FOM_{PR\_MD}$) is calculated using the measured Q-factor and measured reference frequency, the calculation is expressed generally as $FOM_{PR\_MD}=f(Q_{PR\_MD\_FO}, F_{0\_PR\_MD\_FO})$.

After the reference and measured FOMs are calculated they may be compared to one another to determine whether a foreign object is present. When the reference and measured FOMs are close to one another (e.g., within a threshold amount) it may be determined that no foreign object is present. When the reference and measured FOMs differ by more than a threshold amount it may be determined that a foreign object is present. The comparison may be made in any of a variety of ways. For example, the ratio of $FOM_{REF\_MD}$ and $FOM_{PR\_MD}$ may be calculated. If the ratio is within an acceptable range, then it may be determined that no foreign object is present. If the ratio is outside the range, then it may be determined that a foreign object is present.

Figure 2:
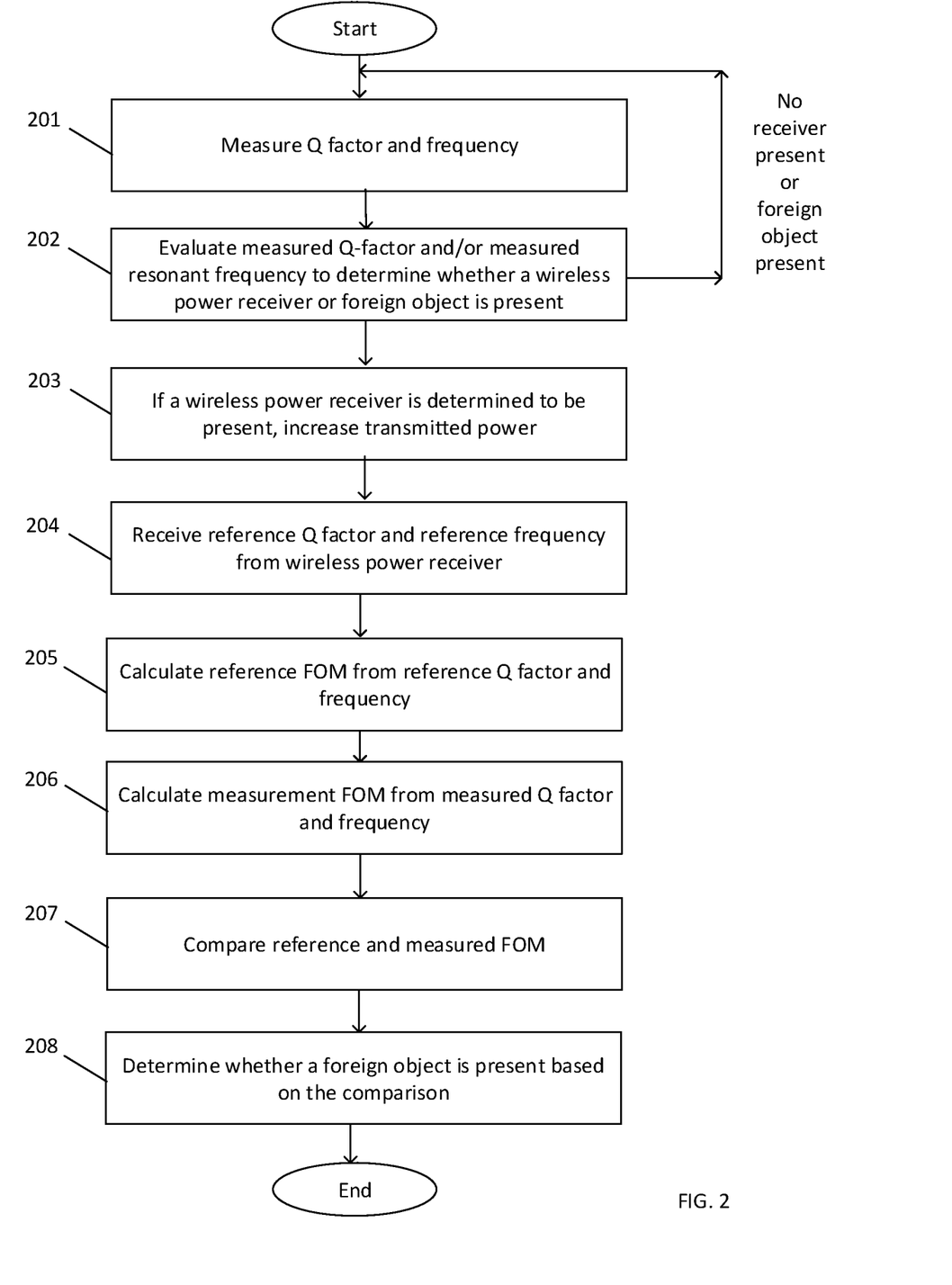
FIG. 2 shows a flowchart of a method of performing foreign object detection, according to some embodiments.

FIG. 2 shows a flowchart of a method of performing foreign object detection (FOD), according to some embodiments. The method of FIG. 2 may be performed by a controller of the wireless power transmitter, for example.

In step 201, the wireless power transmitter 1 measures the Q-factor and resonant frequency for wireless power transmission. The measurements may be performed before the wireless power receiver is in communication with the wireless power transmitter. The measurements may be made by energizing the transmit coil of the wireless power transmitter with relatively low energy, below the level of energy that would energize the wireless power receiver. Such measurements can help determine whether a wireless power receiver is present. The controller of the wireless power transmitter may control such measurements. Any of a variety of suitable of measurement techniques may be used, such as time-domain measurements or frequency domain measurements, for example. Examples of suitable measurements are described in U.S. Published Patent Application 2018/0241257 to Muratov et al., which is hereby incorporated by reference in its entirety.

In step 202, a determination is based on the measured Q-factor, the measured resonant frequency, or both, as to whether a wireless power receiver potentially is present or if a foreign object is present. For example, a moderate change in the Q-factor or resonant frequency with respect to an unloaded wireless power transmitter may indicate a wireless power receiver is potentially present. A significant change in the Q-factor or resonant frequency may indicate that a foreign object is present. For example, if a very low Q-factor is measured, this may be indicative of the presence of a foreign object. If a foreign object is determined to be present or no potential wireless power receiver is detected, the process may start over at the beginning. The wireless power receiver may repeatedly perform measurements in this manner until a potential wireless power receiver is detected.

If a potential wireless power receiver is detected, the wireless power transmitter may increase the transmit power in step 203 to attempt to energize the wireless power receiver and initiate communication. If a wireless power receiver is present then communications are initiated between the wireless power transmitter and the wireless power receiver. They can then exchange information, and the wireless power receiver provides its reference information so that more fine-grained foreign object detection technique may be performed.

In step 204, the reference Q-factor and reference frequency of a wireless power receiver may be received by the wireless power transmitter (e.g., received by the controller through a communication interface of the wireless power transmitter). As discussed above, the reference Q-factor and reference frequency may be received from the wireless power receiver, for example. Any suitable communication technique may be used to send the information, such as wireless radio communication, for example.

In step 205, a reference FOM is calculated using the reference Q-factor and reference frequency. The calculation may be performed by a controller of the wireless power transmitter 1, for example. Any of a variety of suitable FOM calculations may be performed, examples of which are described herein.

In step 206, a measurement FOM may be calculated from the reference Q-factor and measured resonant frequency. The measurement FOM and reference FOM may be calculated using the same equation(s) so that they results may be compared. Any of a variety of suitable FOM calculations may be performed, examples of which are described herein. Although FIG. 2 shows step 206 being performed after step 205 the techniques described herein are not limited in this respect, as step 206 may be performed before step 205 or at the same time as step 206 is performed. Such calculations may be performed any time after the data to be used in the calculations is available.

In step 207, the measurement FOM and reference FOM may be compared. As mentioned above, any suitable comparison may be performed, such as taking the difference or ratio between the FOMs and determining whether the two FOMs differ by less than a threshold amount.

In step 208, a determination is made of whether a foreign object is present based on the comparison. For example, if the comparison indicates the reference and measurement FOMs are similar to one another, it may be determined that no foreign object is present. If the comparison indicates that the reference and measurement FOMs are not similar to one another, the comparison indicates that a foreign object is present. If it is determined that a foreign object is not present, the wireless power transmitter may be allowed to initiate or continue wireless power transfer or allowed to increase the power level of the wireless power transfer. If it is determined that a foreign object is present, the wireless power transmitter may be prevented from initiating or continuing wireless power transfer or controlled to decrease the power level of wireless power transfer.

In some embodiments, the calculation of a figure of merit based on reference Q-factor and reference resonant frequency may be performed by a device other than the wireless power transmitter. As an example, such a calculation may be performed by the wireless power receiver 11. The calculated reference figure of merit $FOM_{REF\_MD}$ may be transmitted from the wireless power receiver 11 to the wireless power transmitter 1 instead of or in addition to the reference Q-factor and reference resonant frequency.

Figure 1B:
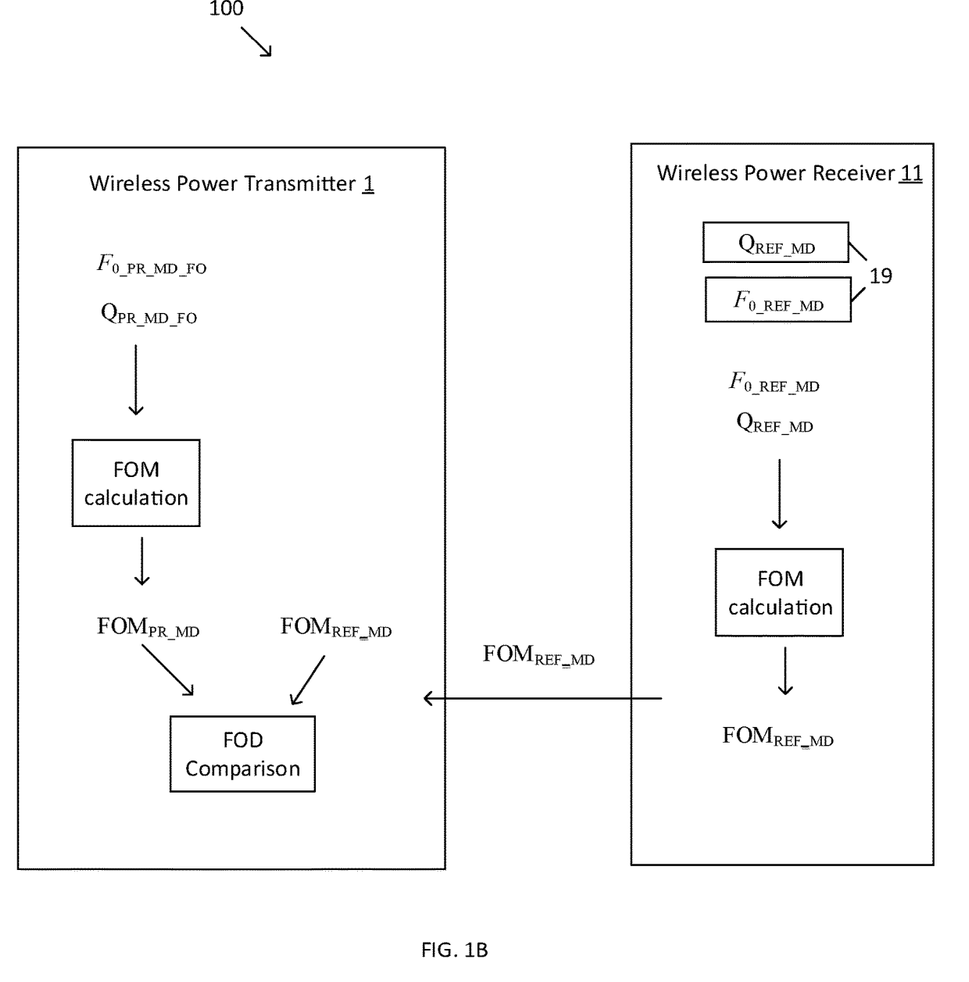
FIG. 1B shows a block diagram of a wireless power system including a wireless power transmitter and a wireless power receiver that provides figure of merit (FOM) derived from a reference Q-factor and reference frequency to the wireless power transmitter for foreign object detection (FOD).

FIG. 1B shows a block diagram of a wireless power system including a wireless power transmitter and a wireless power receiver that provides a figure of merit (FOM) derived from a reference Q-factor and reference frequency to the wireless power transmitter for foreign object detection (FOD). The wireless power receiver may include a controller (e.g., a processor) to perform the calculation. In this example, the reference FOM calculation 205 is performed by the wireless power receiver 11 rather than the wireless power transmitter 1, and prior to step 204. Rather than the wireless power transmitter receiving the reference Q-factor and reference frequency in step 204, the wireless power receiver 1 may receive the calculated reference FOM and store it in the at least one storage device 19 prior to sending it to the wireless power transmitter 1.

In some embodiments, the reference FOM calculation may be performed by a device other than the than the wireless power receiver 11 or wireless power transmitter 1. Any other computing device may perform the calculation and provide it to the wireless power receiver 11 or wireless power transmitter 1. In some embodiments, the reference FOM may be stored in the wireless power receiver 11 (e.g., during a calibration or initialization process of the wireless power receiver).

In some embodiments, any of the calculations described herein may be performed by a device other than the wireless power transmitter 1, such as by the wireless power receiver 11 or another device. For example, the measurement FOM and/or FOD determination may be performed by the wireless power receiver 11. To do so, one or more parameters may be transmitted from the wireless power transmitter 1 to the wireless power receiver to perform the calculation(s). The wireless power receiver 11 may inform the wireless power transmitter 1 of the result of the determination so the wireless power transmitter can take action such as maintaining or changing wireless power transmission accordingly. The wireless power receiver 11 may send one or more control commands to the wireless power transmitter based on the determination, such as commands to stop, reduce, maintain, increase or begin transmission of power wirelesssly.

Example FOM Calculations

Example 1

In some embodiments, an FOM calculation may be based on an expression that has the Q-factor in the numerator and the frequency in the denominator. Below is an example of calculating FOM according to such an embodiment. In some embodiments, the FOM may be corrected by a ratio of the reference and measured FOMs, as shown in equation (4).

$$FOM1_{genral} = \frac{Q_o}{2\pi f_o}; \tag{1}$$

$$FOM1_{REF\_MD} = \frac{Q_{REF\_MD}}{2\pi f_{o\_REF\_MD}}; \tag{2}$$

$$FOM1_{PR\_MD} = \frac{Q_{PR\_MD}}{2\pi f_{o\_PR\_MD}}; \tag{2a}$$

$$FOM1(Tx) = FORM1_{PR\_MD\_FO} = \frac{Q_{PR\_MD\_FO}}{2\pi f_{o\_PR\_MD\_FO}}; \tag{3}$$

$$FOM1(Tx)_{corr} = \frac{Q_{PR\_MD\_FO}}{2\pi f_{o\_PR\_MD\_FO}} \cdot \frac{FOM1_{REF\_MD}}{FOM1_{PR\_MD}}; \tag{4}$$

\* Parameters publically known:
$Q_{REF\_C}$; $f_{0\_REF\_C}$; $C_{REF}$;
Parameters based on calibration performed on the reference publically known coil and sent from the wireless power receiver to the wireless power transmitter:
$Q_{REF\_MD}$; $f_{0\_REF\_MD}$
Parameters made available in the wireless power transmitter:
By design—$Q_{PR\_C}$; $f_{0\_PR\_C}$; $C_{PR}$; $Q_{PR\_MD}$; $f_{0\_PR\_MD}$;
By performing measurement during wireless power transmitter operation—$Q_{PR\_MD\_FO}$; $f_{0\_PR\_MD\_FO}$ Example 2

In some embodiments, an FOM calculation may be based on an expression that has a function of the Q-factor in the numerator and a function of the frequency in the denominator. Below is an example of calculating FOM according to such an embodiment, with a square root of the Q-factor and a square of the frequency being used. In some embodiments, the FOM may be corrected by a ratio of the reference and measured FOMs, as shown in equation (8).

$$FOM2_{genral} = \frac{\sqrt{Q_o}}{2\pi f_o^2}; \tag{5}$$

$$FOM2_{REF\_MD} = \frac{\sqrt{Q_{REF\_MD}}}{2\pi f_{o\_REF\_MD}^2}; \tag{6}$$

$$FOM2_{PR\_MD} = \frac{\sqrt{Q_{PR\_MD}}}{2\pi f_{o\_PR\_MD}^2}; \tag{6a}$$

$$FOM2(Tx) = FORM1_{PR\_MD\_FO} = \frac{\sqrt{Q_{PR\_MD\_FO}}}{2\pi f_{o\_PR\_MD\_FO}^2}; \tag{7}$$

$$FOM2(Tx)_{corr} = \frac{\sqrt{Q_{PR\_MD\_FO}}}{2\pi f_{o\_PR\_MD\_FO}^2} \cdot \frac{FOM2_{REF\_MD}}{FOM2_{PR\_MD}}; \tag{8}$$

\* Parameters publically known:
$Q_{REF\_C}$; $f_{0\_REF\_C}$; $C_{REF}$;
Parameters based on calibration performed on the reference publically known coil and sent from the wireless power receiver to the wireless power transmitter:
$Q_{REF\_MD}$; $f_{0\_REF\_MD}$
Parameters made available in the wireless power transmitter:
By design—$Q_{PR\_C}$; $f_{0\_PR\_C}$; $C_{PR}$; $Q_{PR\_MD}$; $f_{0\_PR\_MD}$;
By performing measurement during wireless power transmitter operation—$Q_{PR\_MD\_FO}$; $f_{0\_PR\_MD\_FO}$ Example 3

In some embodiments, an FOM calculation may be based on an expression that has both the Q-factor and the frequency in the denominator. Below is an example of calculating FOM according to such an embodiment, is based on determining equivalent series resistance (ESR) associated with the foreign object. In some embodiments, the FOM may be corrected by a ratio of the reference and measured FOMs, as shown in equation (12). The ESR value can be derived from the measured Q-factor and resonance frequency of the transmitter coil per equitation (9). Presence of a mobile device (MD) and/or foreign object (FO) on the surface of the TX will change acquired values for Q-factor and frequency. High magnetic permeability materials with low losses like ferrites change measured Q-factor to higher values and measured Fo to lower values. Objects made from conductive materials mostly lower Q-factor and increase resonance frequency Fo.

$$FOM3_{genral} = ESR_{general} = \frac{1}{2\pi \cdot f_o \cdot C \cdot Q}; \tag{9}$$

$$FOM3_{REF\_MD} = ESR_{REF\_MD} = \frac{1}{2\pi \cdot f_{o_{RED\_MD}} \cdot C_{REF} \cdot Q_{REF\_MD}}; \tag{10}$$

$$FOM3_{PR\_MD} = ESR_{PR\_MD} = \frac{1}{2\pi \cdot f_{o_{PR\_MD}} \cdot C_{PR} \cdot Q_{PR\_MD}}; \tag{10a}$$

$$FOM3(Tx) = FOM3_{PR\_MD\_FO} = \tag{11}$$

$$ESR_{PR\_MD\_FO} = \frac{1}{2\pi \cdot f_{o_{PR\_MD\_FO}} \cdot C_{PR} \cdot Q_{PR\_MD\_FO}} - ESR_{PR\_C};$$

-continued $$FOM3(Tx)_{corr} = \frac{f_{o\_PR\_MD\_FO}}{2\pi \cdot f_{o\_REF}^2 \cdot C_{REF} \cdot Q_{PR\_MD\_FO}} - ESP_{PR\_MD} \frac{f_{o\_PR\_MD}^2 C_{PR}}{f_{o\_REF\_C}^2 C_{REF}}; \quad (12)$$

\* Parameters publically known:

$Q_{REF\_C}$; $f_{o\_REF\_C}$; $C_{REF}$;

Parameters based on calibration performed on the reference publically known coil and sent from the wireless power receiver to the wireless power transmitter:

$Q_{REF\_MD}$; $f_{o\_REF\_MD}$

Parameters made available in the wireless power transmitter:

By design—$Q_{PR\_C}$; $f_{o\_PR\_C}$; $C_{PR}$; $Q_{PR\_MD}$; $f_{o\_PD\_MD}$;

By performing measurement during wireless power transmitter operation—$Q_{PR\_MD\_FO}$; $f_{o\_PR\_MD\_FO}$ System Description and Q-factor and Fo Measurements The techniques and devices described herein enable the detection of a foreign object using relatively low power levels. In some embodiments, detection may be performed by energizing and controlling the drive circuit of a wireless power transmitter, and measuring a characteristic of a transient in the wireless power transmitter to measure Q-factor and resonant frequency. Based on the transient characteristic the wireless power transmitter can determine whether a foreign object is present in the field produced by the wireless power transmitter. However, Q-factor and resonant frequency can be measured in any suitable way, and is not limited to measuring a characteristic of a transient. In some embodiments, the Q-factor and/or frequency may be detected by frequency-domain measurements, or a combination of time-domain and frequency-domain measurements.

Figure 3:
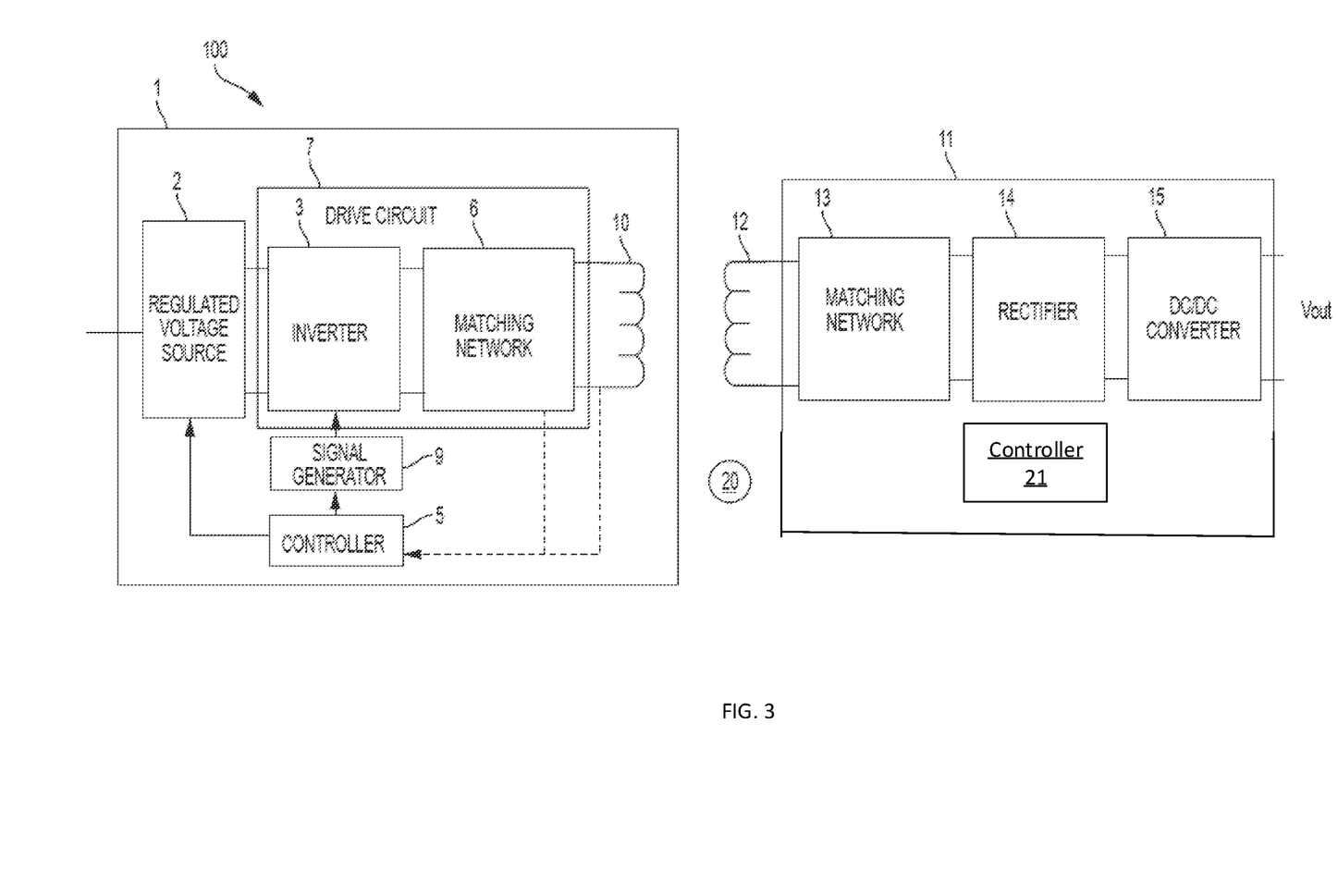
FIG. 3 shows a block diagram of a wireless power system including a wireless power transmitter and a wireless power receiver.

FIG. 3 shows a block diagram of the wireless power system 100 including a wireless power transmitter 1 and a wireless power receiver 11. The wireless power transmitter 1 has a drive circuit 7 including an inverter 3 that drives a transmit coil 10 through a matching network 6. The wireless power transmitter 1 may include a regulated voltage source 2 (e.g., a voltage regulator) that provides a regulated DC voltage to the inverter 3. The regulated voltage source 2 produces a regulated DC output voltage in response to control stimulus from the controller 5. In some embodiments, the drive circuit 7 may be a class D or E amplifier that converts the DC voltage at the input of inverter 3 into an AC output voltage to drive the transmit coil 10. Producing an AC output voltage enables wireless power transmission through electromagnetic induction. The controller 5 may control a signal generator 9 to drive the inverter 3 with signals of a selected wireless power transmission frequency. As an example, the inverter 3 may be switched at a frequency between 100 and 205 kHz to transmit power to a wireless power receiver designed to receive wireless power according to the Qi specification for low power Qi receivers and 80-300 kHz for medium power Qi receivers. The inverter 3 may be switched at a higher frequency, such as a frequency of greater than 1 MHz, within an ISM band, e.g., 6.765 MHz to 6.795 MHz, to transmit power to a receiver designed to receive wireless power using MR technology. However, these frequencies are described merely by way of example, as wireless power may be transmitted at a variety of suitable frequencies, in accordance with any suitable specification. Controller 5 may be an analog circuit or a digital circuit. Controller 5 may be programmable, and may command signal generator 9 to produce signals at a desired transmission frequency based on stored program instructions, so that inverter 3 switches at the desired transmission frequency. Matching network 6 may facilitate wireless power delivery by presenting a suitable impedance to the inverter 3. The matching network(s) may have one or more capacitive or inductive elements or any suitable combination of capacitive and inductive elements. Since the transmit coil 10 may have an inductive impedance, in some embodiments the matching network 6 may include one or more capacitive elements, which, when combined with the impedance(s) of the transmit coil 10, presents an impedance to the output of inverter 3 suitable for driving the transmit coil 10. In some embodiments, during wireless power transfer the resonant frequency of the matching network 6 may be set equal to or approximately equal to the switching frequency of the inverter 3. The transmit coil 10 may be realized by any suitable type of conductors. The conductors may be wires, including solid wire or Litz wire, or patterned conductors, such as patterned conductors of a PC board or an integrated circuit.

The AC current in the transmit coil 10 generates an oscillating magnetic field in accordance with Ampere's law. The oscillating magnetic field induces an AC voltage into a receiver coil 12 of the wireless power receiver 11 in accordance with Faraday's law. The AC voltage induced in the receiver coil 12 is provided through a matching network 13 to a rectifier 14 that generates an unregulated DC voltage. Rectifier 14 may be a synchronous rectifier or may be implemented using diodes. The unregulated DC voltage is regulated using a DC/DC converter 15, the output of which may be filtered and provided to a load as output voltage Vout. In some alternate embodiments the DC/DC converter 15 can be replaced by a linear regulator or battery charger, or eliminated altogether. In some embodiments, the wireless power transmitter 1 and/or receiver 11 may have communication circuitry (e.g., within or outside controller 5 and 21) for communicating with wireless power receiver 11 either through in-band communication or out of band communication. Similarly, wireless power receiver 11 may have communication circuitry for communicating with a wireless power transmitter 1. The wireless power receiver 11 may send feedback information to the wireless power transmitter 1 indicating the power demanded at the wireless power receiver 11, or a change in the power level to be provided. In response, the wireless power transmitter 1 may increase or decrease its power output accordingly. The wireless power transmitter 1 may control the amount of power transmitted by varying the voltage drive level, the frequency of the signal transmitted or both. Any suitable power control techniques may be used.

As shown in FIG. 3, if a conductive foreign object 20 enters the field produced by the transmit coil 10 of the wireless power transmitter 1, the wireless power transmission efficiency may be degraded and/or the conductive foreign object 20 may undergo significant heating. Examples of conductive foreign objects 20 include coins, paperclips, and keys, by way of illustration.

Experimental Data

Figure 4A:
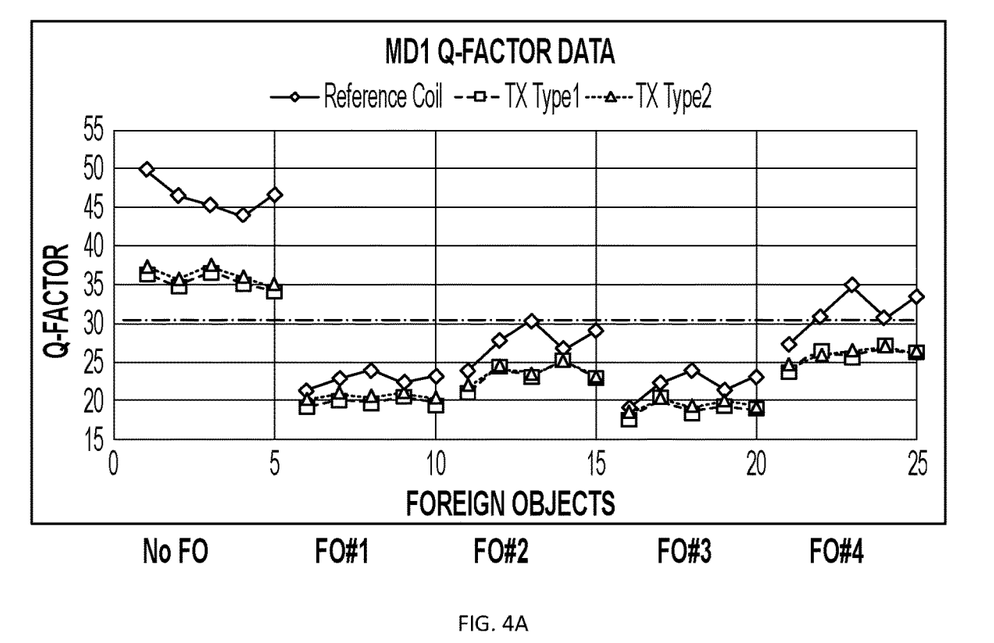
FIGS. 4A-4D show experimental data for Q-factor only measurements as compared to the use of figures of merit based on Q-factor and resonant frequency as described herein.

FIG. 4A shows experimental data from performing foreign object detection by measuring Q-factor of the transmit coil with a mobile device placed on the wireless power transmitter. The Q-factor is shown as measured with no foreign object present and for four different foreign objects. Four Qi-standard foreign objects were used: FO#1—stainless disk; FO#2—stainless ring; FO#3—Aluminum foil disk; and FO#4—the thick aluminum disk. For each case the Q-factor is measured when the mobile device is placed in five different positions on the wireless power transmitter. Three different wireless power transmitters were tested, including a transmitter with a reference coil, TX Type 1 and TX type 2. Parameters of the transmitters are listed below.

FIG. 4A shows two issues with measuring only Q-factor. This figure shows two major problems with such an approach: 1) different types of transmitters and reference coils will have different Q-factor readings for the same mobile device and the same foreign object; 2) the difference between no-FO and with-FO Q-factor measurements is relatively small, e.g., ~15%, and also varies between transmitter types. Accordingly, it may be difficult to distinguish whether a foreign object is present based on Q-factor alone. For example, according to the data shown in FIG. 4A, the Q-factor with no-FO and certain coil types is close to the FO for FO#2 and FO#4 with certain coil types. These shortcomings complicate a unified approach in establishing FO detection policies, regulations and guidelines.

Figure 4B:
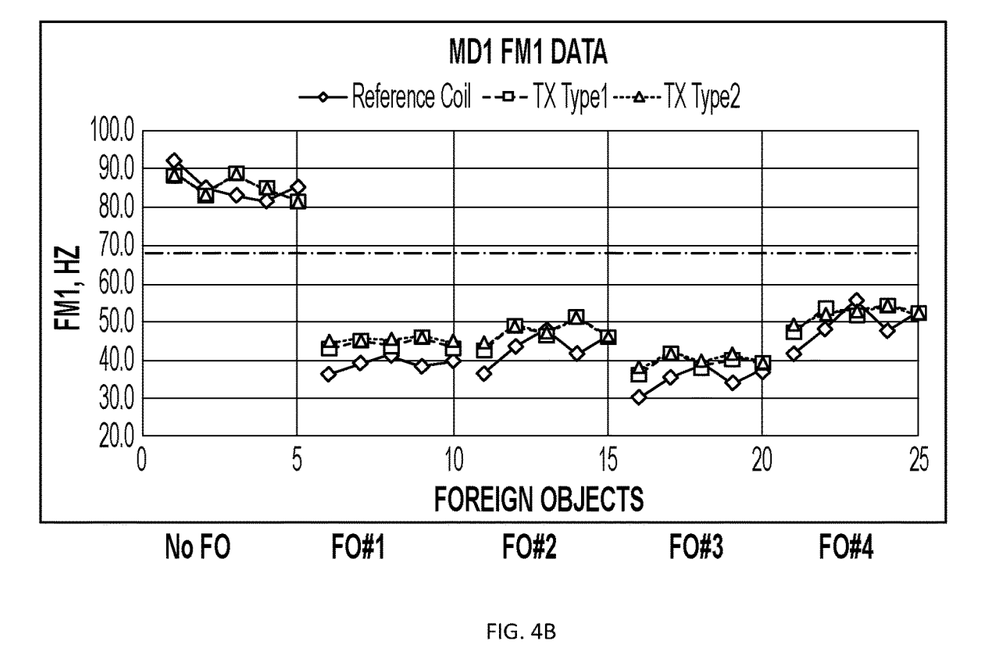

FIG. 4B shows data associated with implementation of foreign object detection in accordance with a FOM calculated according to Example 1. The measurements have a tighter distribution between different transmitter coil types and the reference coil. The difference between no-FO and with-FO Q-factor measurements is increased to ~25%. The ability to establish unified requirements to FOD is significantly improved.

Figure 4C:
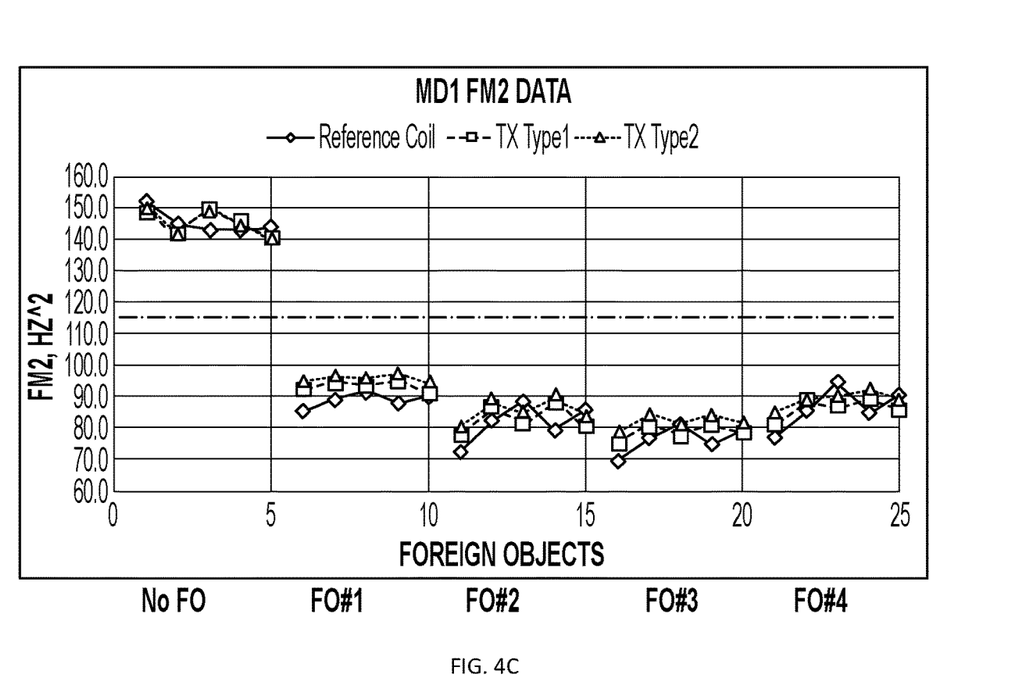

FIG. 4C shows data associated with implementation of foreign object detection in accordance with a FOM calculated according to Example 2. As with FIG. 4B, the measurements have a tighter distribution between different transmitter coil types and the reference coil. The difference between no-FO and with-FO Q-factor measurements is increased to ~35%. The ability to establish unified requirements to FOD is significantly improved.

Figure 4D:
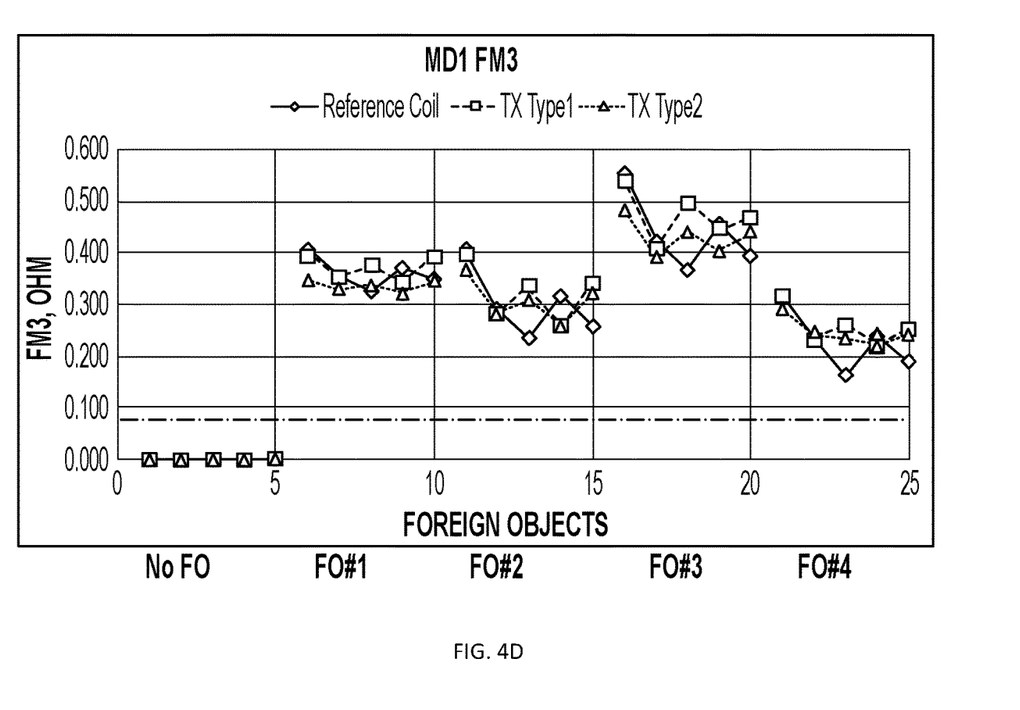

FIG. 4D shows data associated with implementation of foreign object detection in accordance with a FOM calculated according to Example 3. One advantage with Example 3 advantage is that for all transmitter types the no-FO reference case is associated with an FOM of zero, which eases unification. As with FIG. 4B, the measurements have a tighter distribution between different transmitter coil types and the reference coil. The ability to establish unified requirements to FOD is also improved.

Parameters of the above-described coil types:
1. Reference coil
   a. Inductance—24 uH
   b. Number of turns—20 in two layers
   c. Outer diameter Ø43.0 mm
   d. Inner diameter Ø20.5 mm
2. TX Type 1
   a. Inductance—10 uH
   b. Number of turns—12 in one layer
   c. Outer dimensions □48 mm×48 mm
   d. Inner dimensions □19 mm×19 mm
3. TX Type 2
   a. Inductance—8.9 uH
   b. Number of turns—11 in one layer
   c. Outer diameter Ø48.5 mm
   d. Inner diameter Ø23.0 mm Additional Aspects As discussed above, a wireless power transmitter and receiver may be controlled using controller 5 and 21, respectively, which may be implemented by any suitable type of circuitry. For example, the controllers may be implemented using hardware or a combination of hardware and software. When implemented using software, suitable software code can be executed on any suitable processor (e.g., a microprocessor) or collection of processors. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, or other tangible, non-transitory computer-readable storage medium) encoded with a computer program (i.e., a plurality of executable instructions) that, when executed on one or more processors, performs the above-discussed functions of one or more embodiments. In addition, it should be appreciated that the reference to a computer program which, when executed, performs any of the above-discussed functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques discussed herein.

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A method of performing foreign object detection for wireless power transfer between a wireless power transmitter and a wireless power receiver, the method comprising, by the wireless power transmitter:

measuring a first parameter corresponding to Q-factor and a second parameter corresponding to resonant frequency of a system including the wireless power transmitter and the wireless power receiver to produce a first measurement corresponding to a Q-factor measurement and a second measurement corresponding to a resonant frequency measurement, respectively;

calculating a measured figure of merit (FOM) using an equation with the first and second parameters and at least one additional value;

receiving a reference FOM corresponding to a reference Q-factor of the wireless power receiver and a reference frequency of the wireless power receiver, wherein the reference FOM is calculated using the equation and based on the reference Q-factor and the reference frequency and the at least one additional value; and determining whether a foreign object is present based on the measured FOM and the reference FOM.

2. The method of claim 1, further comprising:
comparing the reference FOM and the measured FOM to produce a comparison.

3. The method of claim 2, wherein the determining of whether a foreign object is present is based on the comparison.

4. The method of claim 3, wherein the determining is performed by evaluating whether the reference FOM and the measured FOM differ by more than a threshold amount, or whether a ratio between the reference FOM and the measured FOM differ by more than a threshold amount.

5. The method of claim 1, wherein the reference FOM, the measured FOM, or both, are calculated based on a ratio of a parameter corresponding Q-factor and a parameter corresponding to frequency.

6. The method of claim 1, wherein the reference FOM, the measured FOM, or both, are calculated based on dividing a first function of a parameter corresponding to Q-factor and a second function of a parameter corresponding to frequency.

7. The method of claim 6, wherein the first function comprises a square root function and the second function comprises a square function.

8. The method of claim 1, wherein the reference FOM, the measured FOM, or both, are calculated by determining an equivalent series resistance for the foreign object.

9. The method of claim 8, wherein the reference FOM, the measured FOM, or both, are calculated based on an equivalent series resistance of a conductor acceptable to be present in a field produced by a wireless power transmitter during wireless power transmission.

10. The method of claim 1, further comprising allowing or disallowing wireless power transfer or adjusting transferred power level, based on whether a foreign object is determined to be present.

11. The method of claim 1, further comprising:
prior to the determining, evaluating the first parameter, the second parameter or both, to determine whether the wireless power receiver or a foreign object is present.

12. The method of claim 11, further comprising:
when the wireless power receiver is determined to be present, increasing a strength of a field produced by the wireless power transmitter prior to receiving the one or more third parameters from the wireless power receiver.

13. A controller for a wireless power transmitter, comprising:
circuitry configured to:
measure a first parameter corresponding to Q-factor and a second parameter corresponding to resonant frequency of a system including the wireless power transmitter and a wireless power receiver to produce a first measurement corresponding to a Q-factor measurement and a second measurement corresponding to a resonant frequency measurement, respectively;
calculate a measured figure of merit (FOM) using an equation with the first and second parameters and at least one additional value;
receive a reference FOM corresponding to a reference Q-factor of the wireless power receiver and a reference frequency of the wireless power receiver, wherein the reference FOM is calculated using the equation with the reference Q-factor and the reference frequency and the at least one additional value; and
determine whether a foreign object is present based on the measured FOM and the reference FOM.

14. The controller of claim 13, wherein the controller is configured to calculate a reference figure of merit (FOM) based on the one or more third parameters.

15. The controller of claim 14, wherein the controller is configured to calculate the reference FOM, the measured FOM, or both, based on a ratio of a parameter corresponding Q-factor and a parameter corresponding to frequency.

16. The controller of claim 14, wherein the controller is configured to calculate the reference FOM, the measured FOM, or both, based on dividing a first function of a parameter corresponding to Q-factor and a second function of a parameter corresponding to frequency.

17. The controller of claim 16, wherein the first function comprises a square root function and the second function comprises a square function.

18. The controller of claim 14, wherein the controller is configured to calculate the reference FOM, the measured FOM, or both, by determining an equivalent series resistance for the foreign object.

19. The controller of claim 18, wherein the controller is configured to calculate the reference FOM, the measured FOM, or both, based on an equivalent series resistance of a conductor acceptable to be present in a field produced by a wireless power transmitter during wireless power transmission.

20. The controller of claim 13, wherein the controller is configured to compare the reference FOM and the measured FOM to produce a comparison.

21. The controller of claim 20, wherein the controller is configured to determine whether a foreign object is present is based on the comparison.

22. The controller of claim 21, wherein the determination is made by evaluating whether the reference FOM and the measured FOM differ by more than a threshold amount, or whether a ratio between the reference FOM and the measured FOM differ by more than a threshold amount.

23. The controller of claim 13, wherein the controller is configured to allow or disallow wireless power transfer or adjusting transferred power level, based on whether a foreign object is determined to be present.

24. The controller of claim 13, wherein the controller is configured to:
prior to the determining of whether a foreign object is present, evaluate the first parameter, the second parameter or both, to determine whether the wireless power receiver or a foreign object is present.

25. The controller of claim 13, wherein the controller is configured to:
when the wireless power receiver is determined to be present, increase a strength of a field produced by the wireless power transmitter prior to receiving the one or more third parameters from the wireless power receiver.

26. A wireless power transmitter, comprising:
a controller configured to:
measure a first parameter corresponding to Q-factor and a second parameter corresponding to resonant frequency of a system including the wireless power transmitter and a wireless power receiver to produce a Q-factor measurement and a resonant frequency measurement, respectively;

calculate a measured figure of merit (FOM) using an equation with the first and second parameters and at least one additional value;

receive a reference FOM corresponding to a reference Q-factor of the wireless power receiver and a reference frequency of the wireless power receiver, wherein the reference FOM is calculated using the equation with the reference Q-factor and the reference frequency and the at least one additional value; and determine whether a foreign object is present based on the measured FOM and the reference FOM.

27. A method for use in performing foreign object detection for wireless power transfer between a wireless power transmitter and a wireless power receiver, the method comprising, by the wireless power receiver:

sending one or more parameters to the wireless power transmitter corresponding to a reference Q-factor of the wireless power receiver and a reference frequency of the wireless power receiver; and calculating a reference figure of merit (FOM) using an equation with the reference Q-factor and the reference frequency of the wireless power receiver and at least one additional value.

28. The method of claim 27, further comprising sending at least the reference figure of merit to the wireless power transmitter.

29. A controller for a wireless power receiver, comprising:
circuitry configured to:

control the wireless power receiver to send one or more parameters to a wireless power transmitter corresponding to a reference Q-factor of the wireless power receiver and a reference frequency of the wireless power receiver; and calculate a reference figure of merit (FOM) using an equation with the reference Q-factor and the reference frequency of the wireless power receiver and at least one additional value.

30. The controller of claim 29, wherein the circuitry is configured to control the wireless power receiver to send at least the reference figure of merit to the wireless power transmitter.

31. A wireless power receiver, comprising:
a controller configured to:

control the wireless power receiver to send one or more parameters to a wireless power transmitter corresponding to a reference Q-factor of the wireless power receiver and a reference frequency of the wireless power receiver; and calculate a reference figure of merit (FOM) using an equation with the reference Q-factor and the reference frequency of the wireless power receiver and at least one additional value.

* * * * *